United States Patent [19]

Shinbayashi et al.

[11] Patent Number: 4,855,988
[45] Date of Patent: Aug. 8, 1989

[54] OPTICAL INFORMATION RECORDING AND REPRODUCING APPARATUS WITH AMPLITUDE LIMITATION OF A DETECTED SIGNAL IN A WRITE OPERATION MODE

[75] Inventors: Toshiya Shinbayashi, Yokohama; Takashi Takeuchi, Fujisawa, both of Japan

[73] Assignee: Hitachi, Ltd., Tokyo, Japan

[21] Appl. No.: 943,781

[22] Filed: Dec. 19, 1986

[30] Foreign Application Priority Data

Dec. 24, 1985 [JP] Japan .................. 60-289283

[51] Int. Cl.$^4$ .......................... G11B 7/00; H04B 9/00; G01J 1/32
[52] U.S. Cl. .................. 369/116; 369/122; 250/205; 372/38
[58] Field of Search ............ 369/54, 111, 116, 121, 369/122; 250/205; 372/31, 38, 29

[56] References Cited

U.S. PATENT DOCUMENTS

| | | | |
|---|---|---|---|
| 4,509,156 | 4/1985 | Ohara et al. | 369/116 X |
| 4,516,242 | 5/1985 | Yokota | 372/26 X |
| 4,523,089 | 6/1985 | Maeda et al. | 250/205 |
| 4,685,097 | 8/1987 | van der Put | 369/54 |
| 4,689,795 | 8/1987 | Yoshimoto et al. | 372/31 |
| 4,698,797 | 10/1987 | Komatsu | 369/116 |
| 4,698,817 | 10/1987 | Burley | 372/31 |
| 4,701,609 | 10/1987 | Koishi et al. | 369/116 X |

FOREIGN PATENT DOCUMENTS

| | | | |
|---|---|---|---|
| 59-79440 | 8/1984 | Japan . | |
| 61-16034 | 1/1986 | Japan | 369/54 |
| 61-16035 | 1/1986 | Japan | 369/121 |
| 61-192042 | 8/1986 | Japan | 369/122 |

*Primary Examiner*—Aristotelis M. Psitos
*Attorney, Agent, or Firm*—Antonelli, Terry & Wands

[57] ABSTRACT

The hold mode period of a sample/hold circuit disposed in a control system for controlling a laser diode so as to keep constant luminous power contains the information signal write period, and a third drive circuit for making proper the low level of modulation current of the laser diode is disposed to maintain the low level of laser light in write operation at the proper value.

5 Claims, 9 Drawing Sheets

F I G. 1
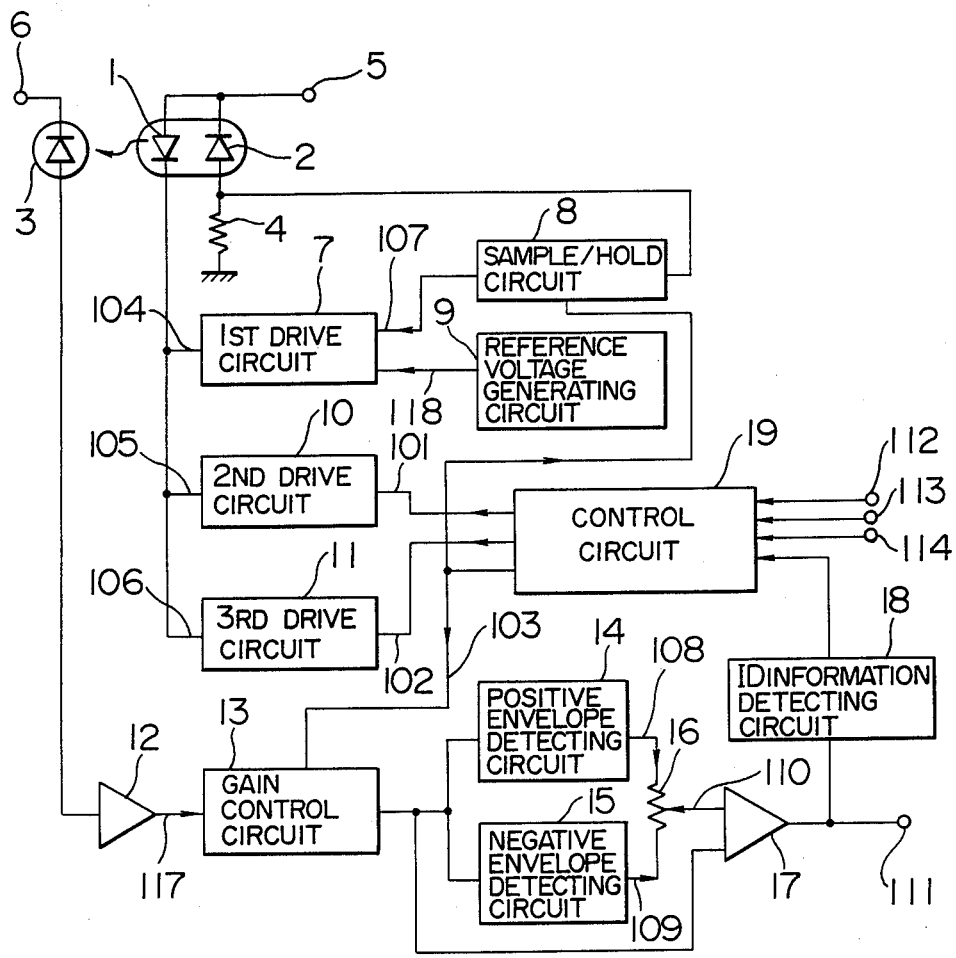

F I G. 10
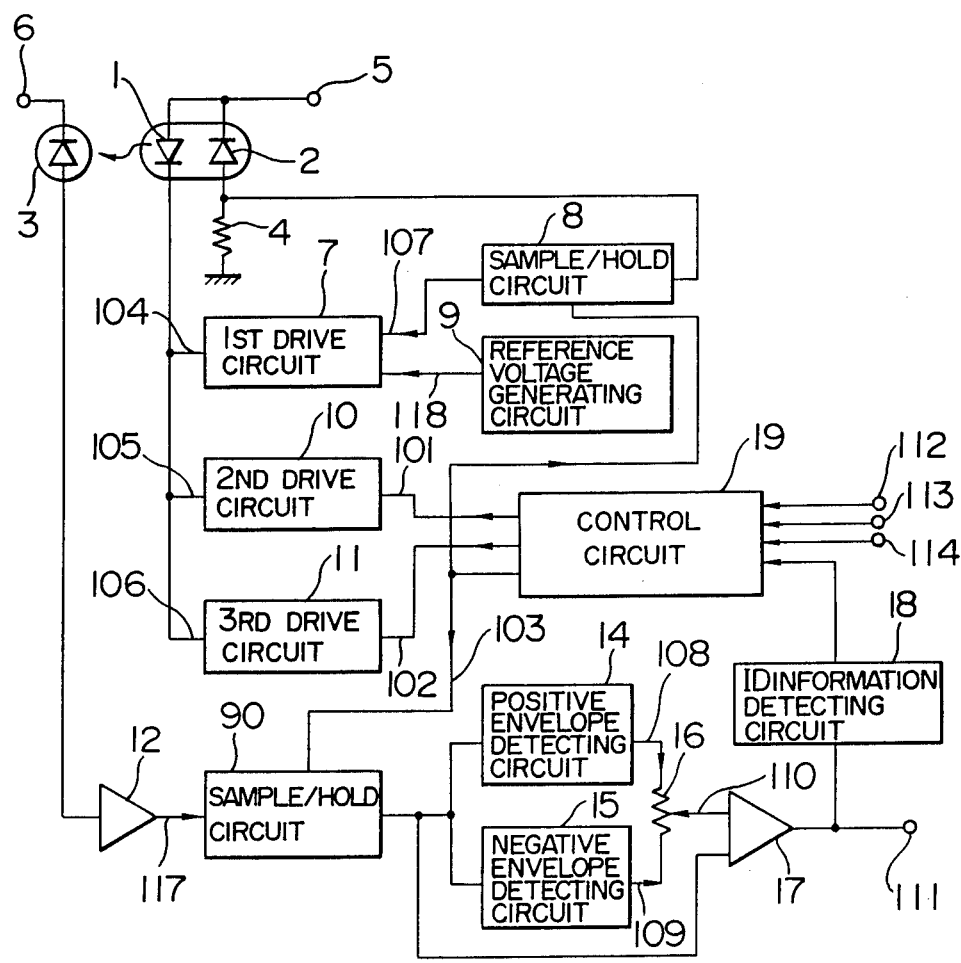

F I G. 11
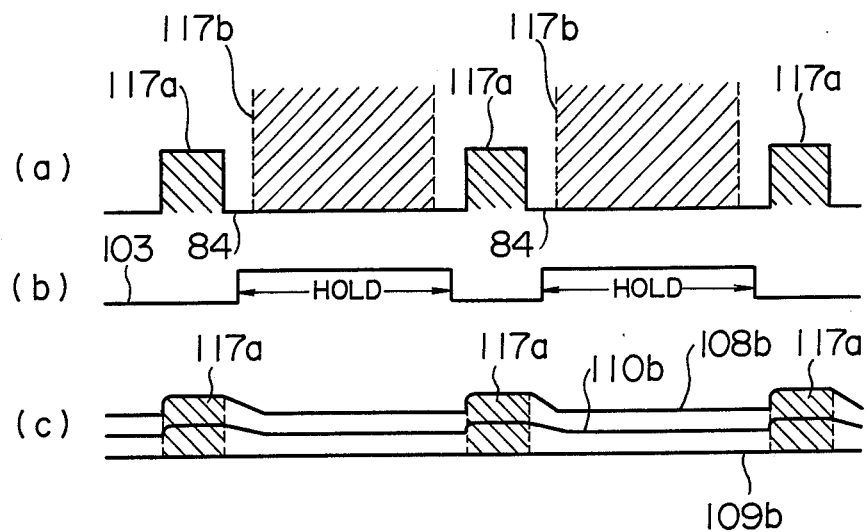
F I G. 14
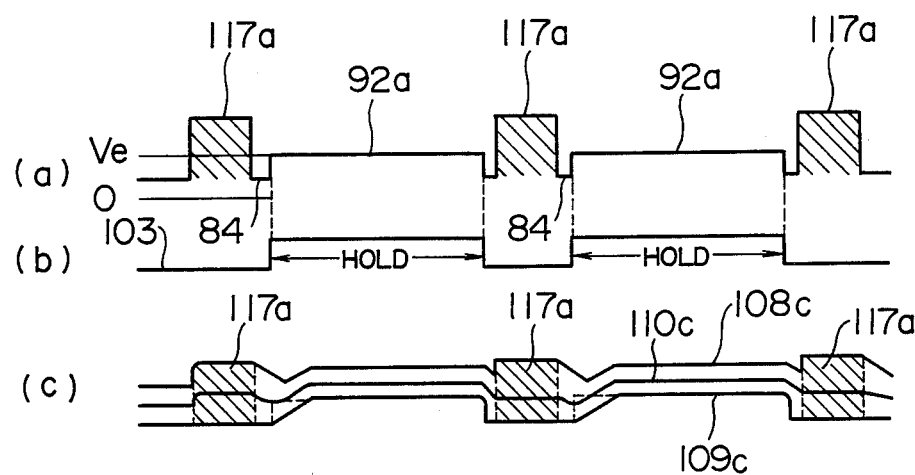

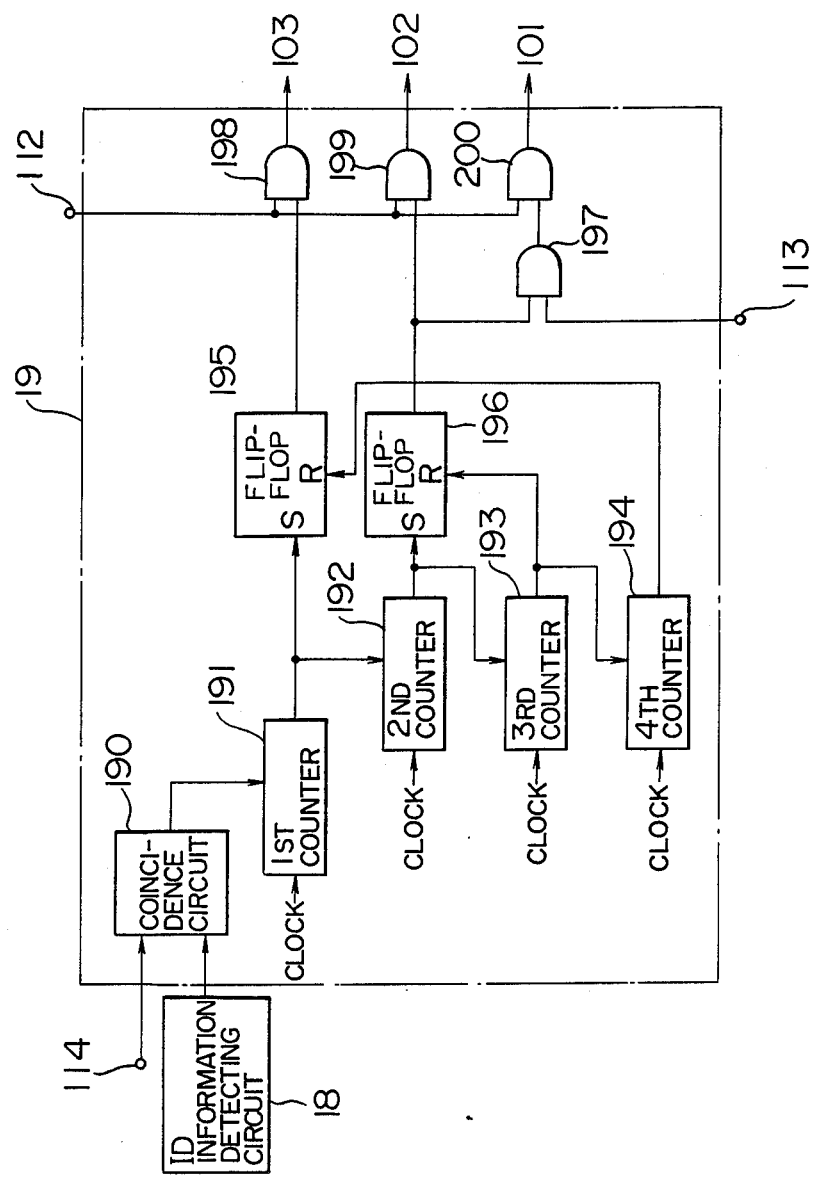

OPTICAL INFORMATION RECORDING AND REPRODUCING APPARATUS WITH AMPLITUDE LIMITATION OF A DETECTED SIGNAL IN A WRITE OPERATION MODE

BACKGROUND OF THE INVENTION

The present invention relates to an optical information recording and reproducing apparatus, and in particular to an optical information recording and reproducing apparatus which can be continuously and quickly changed over without lowering the recording density, in a mode for writing information onto an optical information recording disk (optical disk), between a read operation for reading address information (ID information) recorded beforehand on the optical disk and a write operation for writing information into a desired address.

In order to keep laser luminous power in a read operation at a constant value in conventional optical information recording and reproducing apparatuses (optical disk apparatuses), a part of laser light is received by a photodiode whose output is used for negative feedback control. If the negative feedback control is effected when information is to be written onto the optical disk, however, the average power of the laser light modulated by the recording information is controlled to be equal to the luminous power in a read operation. Thus the power level of the write laser is lowered, the write operation being disabled.

In one scheme of the prior art for solving the above described problem, the reference voltage compared with the output of a photodiode for monitoring the laser luminous power is switched to such a higher value in the write operation as compared with the read operation that the average power of laser light modulated by the recording information will become a desired luminous power as a result of negative feedback control. In another scheme as described in JP-A-59-79440 (laid open on May 8, 1984), a sample/hold circuit is disposed in the negative feedback control system to hold the voltage for providing the laser luminous power in read operation during the write period. As a result, the write pulse signal modulated by the information signal is added to the above described laser luminous power in the read operation.

In the former scheme (prior art 1), however, changeover between the write operation and the read operation cannot be made at high speed because of the slow response of the negative feedback control system. Accordingly information cannot be written continuously and rapidly. In the latter scheme (prior art 2), it is not considered to properly assure the low level of laser light modulated by the recording information. As will be apparent from the description below, therefore, the information sometimes cannot be written properly. In addition, the recording density of the optical disk must be unadvantageously lowered in order to avoid the state in which the ID information cannot be properly detected.

SUMMARY OF THE INVENTION

An object of the present invention is to provide an optical information recording and reproducing apparatus which is free from the above described drawbacks of the prior art, and which allows properly assuring the low level of laser light modulated by the recording information, properly detecting the ID information without lowering the recording density, and continuously and rapidly switching between the write operation and the read operation in the information write mode.

In accordance with one aspect of the present invention, therefore, the hold mode period of a sample/hold circuit disposed in a control system for controlling a laser diode so as to keep constant luminous power contains the information signal write period, and a third drive circuit for making proper the low level of modulation current of the laser diode is disposed to keep the low level of laser light in the write operation at the proper value.

In accordance with another aspect of the present invention, means for controlling the reproduced signal level is so disposed at a stage preceding a binary coding circuit for converting the reproduced signal into a binary signal that the ID information may be accurately detected in the write mode without lowering the recording density of the optical disk.

BRIEF DESCRIPTION OF THE DRAWINGS

FIG. 1 is a block diagram for illustrating the first embodiment of the present invention.

FIG. 10 is a block diagram for illustrating the second embodiment of the present invention.

FIG. 11,(a)–(c), is a signal waveform diagram for illustrating the operation of a binary coding circuit shown in FIG. 10 having a sample/hold circuit at the preceding stage.

FIG. 13 is a block diagram for illustrating a concrete example of a control circuit shown in FIGS. 1, 10 and 12.

FIG. 14,(a)–(c), is a signal waveform diagram for illustrating the operation of a binary coding circuit shown in FIG. 12 having switch means and a constant voltage source at the preceding stage.

DESCRIPTION OF THE PREFERRED EMBODIMENTS

Figure 2:
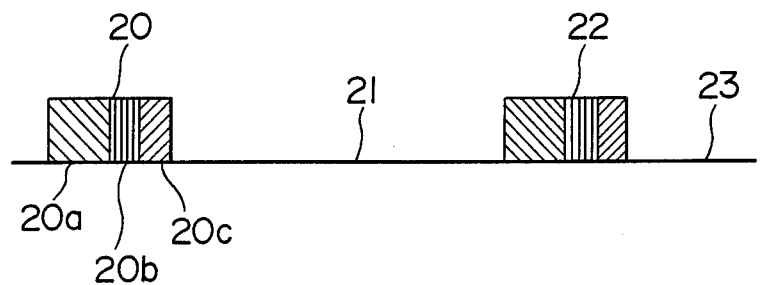
FIG. 2 is a schematic diagram of a reproduced signal from an optical disk with no information signal written therein.

FIG. 1 is a block diagram for illustrating an embodiment of the present invention.

In FIG. 1, a laser diode 1 is driven by the first drive circuit 7, the second drive circuit 10, and the third drive circuit 11 which will be described later.

The luminous power of the laser diode 1 is monitored by a photodiode 2. And the voltage corresponding to the luminous power is detected by a photodiode 2 and a resistor 4. The first drive circuit 7 compares the detected voltage value transmitted through a sample/hold circuit 8 with the reference value supplied from a reference voltage generating circuit 9. Based upon the resultant difference, the first drive circuit controls the laser diode 1 so that the above described luminous power may be constant. Terminals 5 and 6 are connected to respective positive power sources.

In response to an information signal 101 supplied in write operation from a control circuit 19 which will be described later, the second drive circuit 10 outputs modulation currents composed of currents respectively having a value zero and a predetermined value.

In response to an operation signal 102 supplied in the write operation from the control circuit 19, the third drive circuit 11 adds a constant current to the above described modulation current to define the low level of the modulation current of the laser diode 1.

A detector (photodiode) 3 detects the light emitted from the laser diode 1 and reflected by an optical disk which is not illustrated. The signal detected by the detector 3 is amplified by a preamplifier 12. The amplified signal is supplied to a positive envelope detecting circuit 14 and a negative envelope detecting circuit 15 through a gain control circuit 13 as well as to one of input terminals of a voltage comparator 17. The other of input terminals of the voltage comparator is supplied with threshold voltage 110 resulting from voltage division of outputs of the positive envelope detecting circuit 14 and the negative envelope detecting circuit 15 by using a resistor 16.

The positive envelope detecting circuit 14, the negative envelope detecting circuit 15, the potentiometer 16, and the voltage comparator 17 constitute a binary coding circuit. An ID information detecting circuit 18 detects the ID information out of the output of the voltage comparator 17 and supplies the ID information thus detected to the control circuit 19. Numeral 111 denotes an output terminal. Input terminals 112, 113 and 114 are provided for receiving a write/read mode command signal, an information signal to be written, and an address command signal, respectively.

The circuit operation of the present embodiment in the write mode will now be described by conveniently referring to drawings.

FIG. 2 is a schematic diagram of a signal 117 reproduced from the optical disk having no information written thereon.

The ID information signals 20, 22 and so on are recorded on the optical disk beforehand. Each ID information is composed of a clock synchronization signal 20a, an address signal 20b and an error correction code 20c. Information is not yet recorded on portions 21 and 23 of FIG. 2.

In the write mode, it is judged by the control circuit 19 as described later whether the current address is a desired address on the basis of the ID information detecting circuit. When the current address has reached the desired address, an information signal 101 supplied from the input terminal 113, an operation signal 102 and a control signal 103 are supplied to the second drive circuit 10, to the third drive circuit 11, to the sample/hold circuit 8 and to the gain control circuit 13, respectively.

Figure 3:
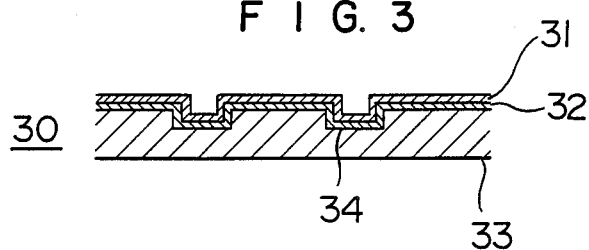
FIG. 3 is a sectional view of a part of the optical disk.

FIG. 3 is a sectional view of an optical disk 30 having a recording film of Te protoxide.

The optical disk 30 is composed of a recording film 32 and a guard film 31 formed on a substrate 33 made of polycarbonate, for example. For the purpose of tracking control, guard grooves (tracks) 34 are formed on the optical disk beforehand. When laser light is applied onto the recording film 32, a rise in temperature of the radiated portion causes a chemical phase change (a reflectivity change). The reflectivity of that portion is thus raised to record the information signal.

Figure 4:
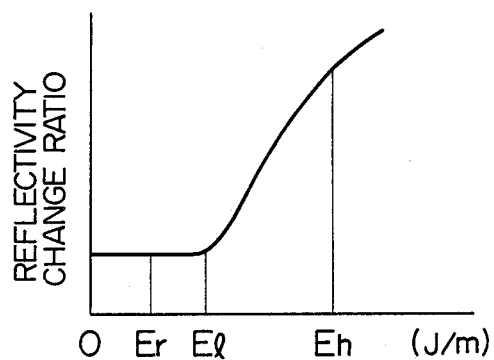
FIG. 4 is a characteristic diagram for illustrating the relationship between the reflectivity change ratio and the linear energy density.

FIG. 4 shows the reflectivity change ratio of the recording film as a function of the linear energy density of the optical disk in the track direction.

In the read operation, the first drive circuit 7 applies negative feedback control to the luminous power of the laser diode 1 to produce such a low linear energy density $E_r$ as not to cause a reflectivity change. In the read operation, the sample/hold circuit 8 assumes the sample mode. That is to say, the sample/hold circuit 8 does not hold the detected voltage supplied to the input thereof, but passes it as the output signal 107 as it is.

While the information signal 101 representing a predetermined current value is supplied from the control circuit 19 to the second drive circuit 10 in the write operation, a modulation current 105 is caused to flow through the laser diode 1 by the second drive circuit 10. The resultant luminous power corresponds to the linear energy densities between $E_h$ and $E_l$ of FIG. 4 which cause a change in reflectivity of the recording film 32.

In response to the operation signal 102 supplied from the control circuit 19 in the write operation, the third drive circuit 11 causes a current 106 to flow through the laser diode 1 to add a constant value to the above described modulation current 105. Upon application of the constant current value, the low level value of the linear energy density on the recording film 32 is changed to the critical value $E_l$ causing a reflectivity change.

In the write operation, the sample/hold circuit 8 assumes the hold mode by the control signal 103 supplied from the control circuit 19. That is to say, the sample/hold circuit 8 holds the detected voltage supplied to its input in the read operation and supplies the voltage value thus held to the first drive circuit 7 as the output signal 107. As a result, the first drive circuit 7 causes such a constant current 104 to flow through the laser diode 1 as to produce the linear energy density $E_r$ in the same way as the read operation.

Figure 5:
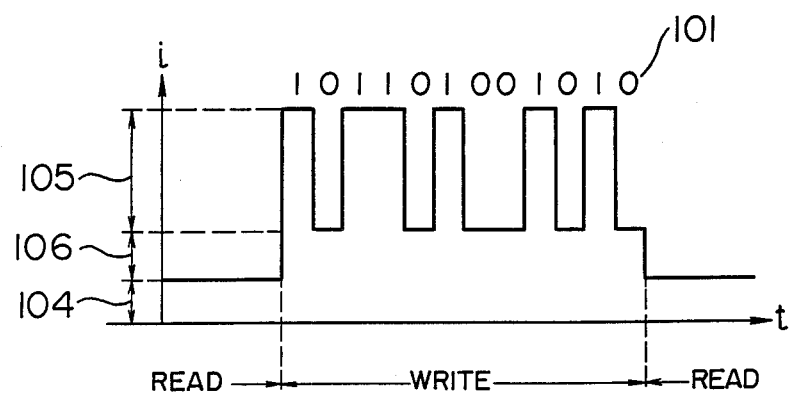
FIG. 5 is a state diagram for illustrating the drive current of a laser diode.

FIG. 5 shows states of the drive current (i) corresponding to the luminous power of the laser diode 1 in the read operation and the write operation.

When the information signal 101 represented by a logical value "1" or "0" is to be written, the laser diode 1 is driven by a sum current of currents 104, 105 and 106 of the first, second and third drive circuits 7, 10 and 11 as evident from FIG. 5.

In the write operation, the luminous power must be properly raised as described above. If the negative feedback control system of the first drive circuit 7 is activated, therefore, the luminous power is limited as described in "BACKGROUND OF THE INVENTION". Accordingly, it is understood that in the write operation the sample/hold circuit 8 must be led into the hold mode to hold the detected voltage supplied thereto in the read operation and keep the magnitude of the current 104 at a constant value.

If the sample/hold circuit 8 is changed over between the sample mode and the hold mode simultaneously with the changeover between the write operation and the read operation and a delay time $\tau_1$ of the sample/ hold circuit 8 is not negligible, the modulation current 105 and the current 106 to be added thereto flow through the laser diode 1 before the sample/hold circuit 8 is changed into the hold mode. In the hold mode, therefore, the detected voltage of high level supplied to the sample/hold circuit 8 is held. If, on the contrary, the delay $\tau_2$ of the second drive circuit 10 and the third drive circuit 11 is not negligible, the negative feedback control system of the first drive circuit 7 is activated while the luminous power is still strong. In the former case, therefore, the current 104 of the first drive circuit 7 is reduced and hence sufficient luminous power necessary for the write operation is not obtained. In the latter case, the luminous power unadvantageously fluctuates in the read operation.

Figure 6:
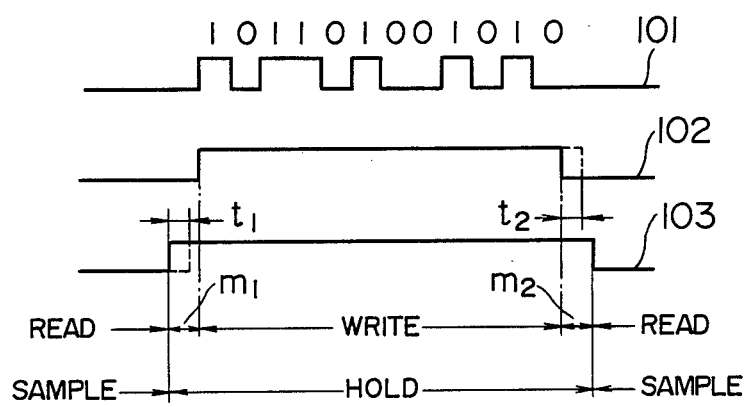
FIGS. 6 and 7(a)–7(e) are signal waveform diagrams for illustrating the establishment of the hold mode period of a sample/hold circuit 8.

In this embodiment, therefore, the sample/hold circuit 8 is controlled in the write operation period by the control signal 103 to be brought into the hold mode earlier by $m_1$ ($m_1 > t_1$) and brought into the sample mode later by $m_2$ ($m_2 > t_2$) as compared with the activation signal 102 for activating the third drive circuit 11 as shown in FIG. 6. As a result, the above described problem is solved.

FIG. 7(a) through (e) are signal waveform diagrams (time charts) for clarifying the timing relation between signals described above.

FIG. 7(a) shows the signal reproduced (or read out) from the optical disk before the information signal is written therein. The ID information signal 20 representing the k-th address and the ID information signal 22 representing the (k+1)-th address are shown. FIG. 7(b), (c) and (d) show the information signal 101 to be written into the optical disk, the activation signal 102 of the third drive circuit 11, and the control signal 103 of the sample/hold circuit 8, respectively. FIG. 7(e) shows the reproduced signals when the information signal is written onto the optical disk on the basis of the above described signals shown in FIG. 7(a) through (d). It is evident from FIG. 7(c) through (e) that in the present embodiment unrecorded gaps 25, 26 and 28 are disposed in changeover between the write operation and the read operation. The length of the gaps 25 and 28 is defined to be longer than $m_1$. And the length of the gap 26 is defined to be longer than $m_2$.

Production of the above described activation signal 102 and the control signal 103 will now be described by referring to a concrete circuit example of the control circuit 19.

FIG. 13 is a block diagram for illustrating a concrete example of the control circuit 19. Identical symbols are employed in FIG. 13 to designate portions identical with or like those of FIG. 1.

Figure 7:
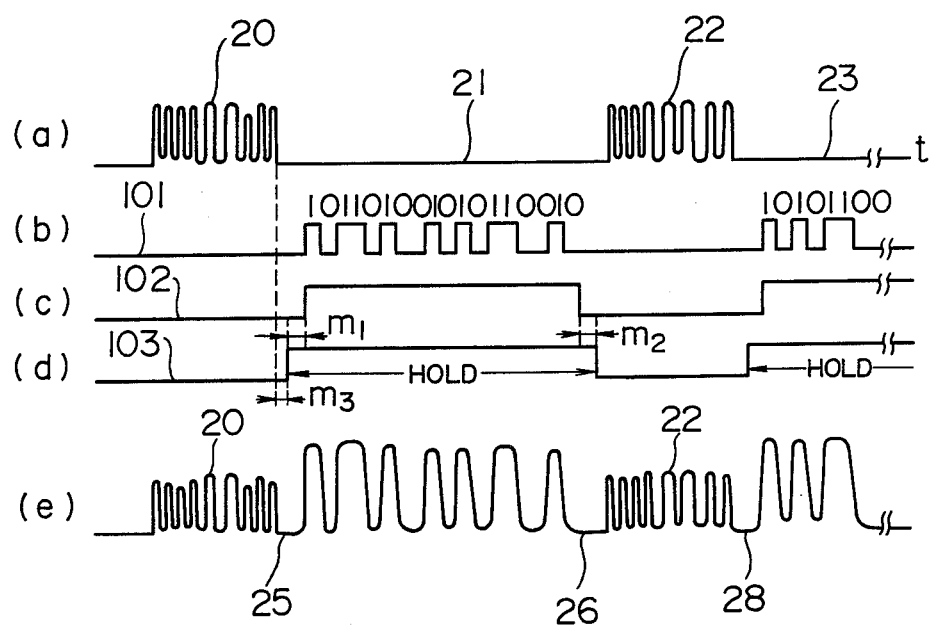

A coincidence circuit 190 of FIG. 13 supplies a clear signal to the first counter 191 to clear it when the ID information signal supplied from the ID information detecting circuit 18 has agreed with the address command signal supplied beforehand through the input terminal 114. When the time corresponding to the period $m_3$ as shown in FIG. 7 has elapsed since the first counter 191 was cleared, the first counter 191 sends out the first carry signal. The first counter 191 is cleared at the falling edge of the tail end of an ID information signal. The first carry signal clears the second counter 192 and sets the first flip-flop 195. As shown in FIG. 7(a) and (d), therefore, the control signal 103 of high level is sent out from the first flip-flop 195 when a period m has elapsed since the falling edge of the tail end of an ID information signal (as represented by the ID information signal 20 in FIG. 7). Since the input terminal 112 is supplied with the write mode command signal as the high level, the first to third AND gates 198 to 200 are open. Accordingly, the control signal 103 exhibiting the high level is sent out through the first AND gate 198.

When the time corresponding to the period 11 has elapsed since the second counter 192 was cleared by the first carry signal, the second carry signal is sent out by the second counter 192. The second carry signal clears the third counter 193 and sets the second flip-flop 96. As shown in FIG. 7(c) and (d), the second flip-flop 196 sends out the activation signal 102 which assumes the high level when the period ml has elapsed since the rise of the control signal 103. The activation signal 102 is supplied to the third drive circuit 11 through the second AND gate 199.

When the time corresponding to the duration of the information signal 101 supplied from the input terminal 113 has elapsed since the third counter 193 was cleared by the second carry signal, the third counter sends out the third carry signal. The third carry signal clears the fourth counter 194 and resets the second flip-flop 196. As shown in FIG. 7(b) and (c), therefore, the activation signal 102 sent out from the second flip-flop 196 through the second AND gate 199 falls down.

When the time corresponding to the period $m_2$ has elapsed since the fourth counter was cleared by the third carry signal, the fourth counter 194 supplies the fourth carry signal to the reset terminal of the first flip-flop 195. As shown in FIG. 7(c) and (d), therefore, the control signal 103 which is the output of the first flip-flop 195 and hence of the first AND gate 198 falls down when the period $m_2$ has elapsed since the activation signal 102 fell down.

It is easily understood that the information signal 101 supplied from the input terminal 113 is supplied to the second drive circuit 10 through the fourth AND gate 197 and the third AND gate 200.

The operation of the binary coding circuit for converting a reproduced signal 117 into a binary value will now be described in detail.

Figure 8:
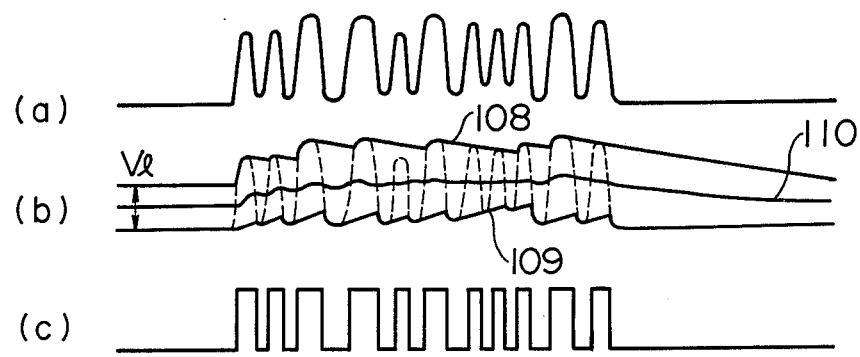
FIG. 8,(a)–(c), is a signal waveform diagram for illustrating the basic operation of a binary coding circuit.

FIG. 8(a) through (c) are signal waveform diagrams for illustrating the basic operation of the binary coding circuit.

If the signal as shown in FIG. 8(a) is supplied to the binary coding circuit, the input signal (a) is supplied not only to one of input terminals of the voltage comparator 17 but also to the positive envelope detecting circuit 14 and the negative envelope detecting circuit 15. As a result, a positive envelope signal 108 and a negative envelope signal 109 as shown in FIG. 8(b) are detected from the positive envelope detecting circuit 14, and the negative envelope detecting circuit 15, respectively. On the basis of the positive envelope signal 108 and the negative envelope signal 109, threshold voltage 110 as shown in FIG. 8(b) is produced by the potentiometer 16. And the threshold voltage 110 is supplied to the other of input terminals of the voltage comparator 17. Accordingly, the voltage comparator 17 sends out a signal obtained by converting the input signal (a) into a binary value with reference to the threshold voltage 110. FIG. 8(c) shows the resultant binary-valued signal.

In order to keep the level of the positive envelope signal 108 from falling below the sum of the level of the negative envelope signal 109 and V1, a limiter is disposed in the positive envelope detecting circuit 14.

Even when no signal is present, therefore, a signal having a proper base level is sent out.

Figure 9:
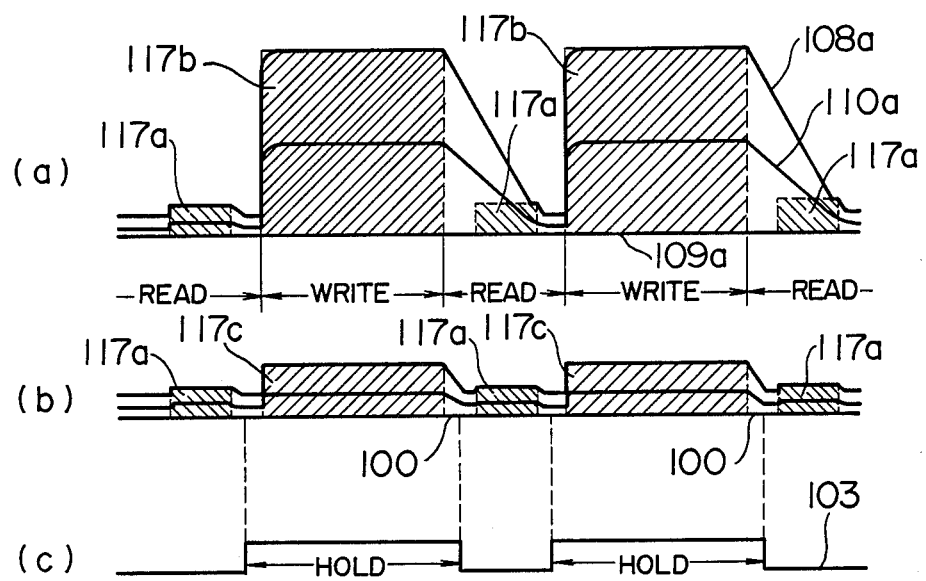
FIG. 9,(a)–(c), is a signal waveform diagram for illustrating the operation of the binary coding circuit shown in FIG. 1 having a gain control circuit at the preceding stage.

In the write operation, the luminous power of a laser diode is typically several times to ten times that in the read operation. Assuming that the gain control circuit 13 is not disposed as in the above described prior art example 2, therefore, there occurs a large level change between the reproduced signal (ID information signal) 117a in the read operation and the reproduced signal 117b in the write operation as schematically shown in FIG. 9(a). Accordingly, the response of the positive envelope detecting circuit 14 is delayed and hence the positive envelope signal takes the shape represented by 108a. Symbol 109a denotes the negative envelope signal.

Accordingly, the threshold voltage takes the shape represented by 110a. Immediately after the write operation, the ID information signal cannot be properly converted into a binary value. That is to say, the ID information signal cannot be properly detected.

In the prior art, therefore, the interval between ID information signals on the optical disk is made large to obtain such a large gap between the reproduced signal 117b in the write operation and the reproduced signal 117a of the ID information signal in the read operation that the ID information signal may be accurately converted into a binary value by using the threshold voltage 110a. Accordingly, the recording density of the optical disk is inevitably lowered.

In the present embodiment, the gain control circuit 13 is disposed at a stage preceding the binary decision circuit to control the gain so as to lower the level of the reproduced signal in the write operation. As illustrated in FIG. 9(b), therefore, a gap 100 between the reproduced signal 117c in the write operation and the reproduced signal 117a of the ID information signal in the read operation is not made large as in the prior art example. During the gap period, the response of the positive envelope detecting circuit 14 becomes adequate. It is thus possible to accurately convert the ID information signal into a binary value. Accordingly, it is possible to accurately detect the ID information signal.

In the present embodiment, the gain of the gain control circuit 13 in the write operation is lowered by using the above described control signal 103 as shown in FIG. 9(c).

FIG. 10 is a block diagram for illustrating the second embodiment of an optical information recording and reproducing apparatus according to the present invention. Identical symbols are employed in FIG. 10 to designate portions identical with or like those of FIG. 1.

The second embodiment differs from the first embodiment shown in FIG. 1 in that a sample/hold circuit 90 is disposed instead of the gain control circuit 13.

FIG. 11(a) through (c) are signal waveform diagrams for illustrating the operation of the binary coding circuit of the second embodiment.

FIG. 11(a) schematically shows the output signal of the sample/hold circuit 90 placed in the sample mode. That is to say, the waveform state of FIG. 11(a) is similar to that of FIG. 9(a). Unless the recording density is lowered, therefore, the reproduced signal 117a of the ID information signal cannot be properly converted into a binary value.

In the present embodiment, the sample/hold circuit 90 is placed in the hold mode by the control signal 103 shown in FIG. 11(b) for placing the sample/hold circuit 8 in the sample mode. And the level of the reproduced signal in an unrecorded gap 84 between the reproduced signal 117a of the ID information signal in the read operation and the reproduced signal 117b in the write operation is maintained during the write period.

In the present embodiment, therefore, the positive envelope signal takes the shape represented by 108b and the negative envelope signal takes the shape represented by 109b as shown in FIG. 11(c). Accordingly, the threshold voltage takes the shape represented by 110b. Immediately after the write operation, therefore, the reproduced signal 117a of the ID information signal can be accurately converted into a binary value.

Figure 12:
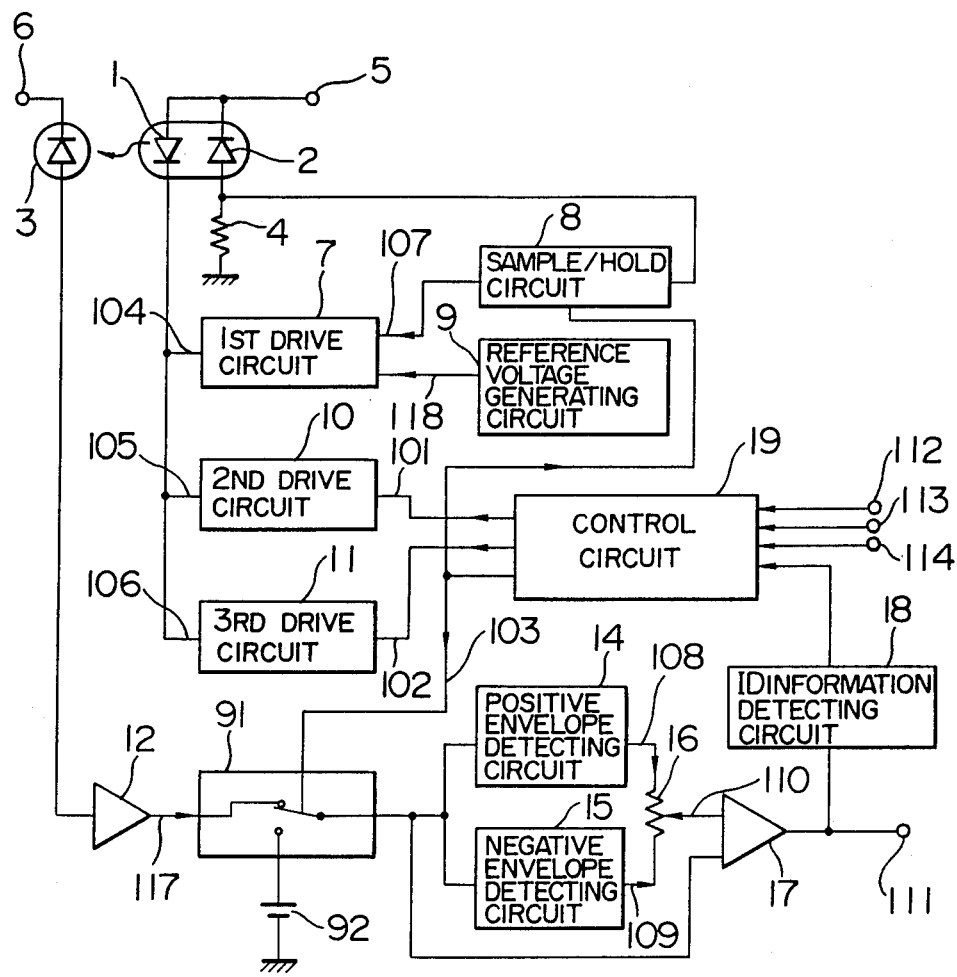
FIG. 12 is a block diagram for illustrating the third embodiment of the present invention.

FIG. 12 is a block diagram for illustrating the third embodiment of the present invention. Identical symbols are employed in FIG. 12 to designate portions identical with or like those of FIG. 1.

The third embodiment differs from the first embodiment in that switch means 91 and a constant voltage source 92 are disposed instead of the gain control circuit 13.

FIG. 14(a) through (c) are signal waveform diagrams for illustrating the operation of a binary coding circuit in the third embodiment.

While the control signal 103 with high level is supplied to the sample/hold circuit 8 to place it in the hold mode as shown in FIG. 14(b), the traveling contact of the switch means 91 is connected to the constant voltage source 92. While the control signal 103 assumes the low level, the traveling contact is switched to be connected to the preamplifier 12. As a result, the output signal of the switch means 91 has a waveform as shown in FIG. 14(a). That is to say, the reproduced signal 117a of the ID information signal in the read operation is sent out as it is. However, the reproduced signal in the write operation is not sent out. Instead, a signal 92a having constant voltage Ve is sent out.

In the present embodiment, therefore, the positive envelope signal has a waveform as represented by 108c of FIG. 14(c) and the negative envelope signal has a waveform as represented by 109c. Therefore, the threshold voltage has a waveform as represented by 110c. Immediately after the write operation, therefore, the reproduced signal 117a of the ID information signal can be accurately converted into a binary value.

The constant voltage of the constant voltage source 92 may have an arbitrary value so long as it belongs to such a range that the envelope detecting circuit may properly respond to the value. For example, the constant voltage value may be lower than the level of the unrecorded gap 84.

It is evident from the foregoing description that effects as listed below are attained owing to the present invention.

(1) Since the third drive circuit for making proper the low level of the modulation current of the laser diode is disposed, it is possible to keep the low level of laser light in the write operation at a proper value.

(2) Since the hold mode period of the sample/hold circuit disposed in the control system of the first drive circuit for controlling the laser diode so as to keep its luminous power constant contains the write period of the information signal, the luminous power of the laser diode is surely controlled by the first drive circuit through the read operation and the write operation even if the response delay exists in the sample/hold circuit or the second and third drive circuits.

(3) Since means for controlling the reproduced signal level is disposed at the stage preceding the binary coding circuit, the ID information can be accurately detected without lowering the recording density of the optical disk.

What is claimed is:

1. An optical information recording and reproducing apparatus having a single semiconductor laser for recording information bits on an optical recording film with laser light responsive to a drive current modulated by an information signal during a write operation mode and for radiating constant readout laser light onto said recording film to reproduce signals recorded on the recording film during a read operation mode, comprising:

means for detecting light reflected from said optical recording film and for converting the detected reflected light to an electric signal;

a binary coding circuit including means for detecting a positive envelope signal and a negative envelope signal with respect to said electric signal, means for producing a threshold signal in accordance with said positive and negative envelope signals, and means for comparing said electric signal with said threshold signal so as to convert said electric signal to a binary signal; and amplitude limiting means for limiting the amplitude of said electric signal during the write operation mode, said amplitude limiting means being disposed at a stage preceding said binary coding circuit.

2. An optical information recording and reproducing apparatus according to claim 1, wherein said amplitude limiting means comprises a gain control circuit.

3. An optical information recording and reproducing apparatus according to claim 1, wherein said amplitude limiting means comprises a sample/hold circuit.

4. An optical information recording and reproducing apparatus according to claim 1, wherein said amplitude limiting means comprises switch means changed over to supply a constant voltage to said binary coding circuit during the write operation mode.

5. An optical information recording and reproducing apparatus according to claim 1, wherein said threshold signal producing means includes means for applying voltage division to said positive and negative envelope signals.

* * * * *